United States Patent
Verhoog et al.

[11] Patent Number: 5,985,483
[45] Date of Patent: Nov. 16, 1999

[54] SEALED BATTERY BLOCK PROVIDED WITH A COOLING SYSTEM

[75] Inventors: Roëlof Verhoog, Bordeaux; Jean-Loup Barbotin, Pompignac, both of France

[73] Assignee: Alcatel, Paris, France

[21] Appl. No.: 09/018,442

[22] Filed: Feb. 4, 1998

[30] Foreign Application Priority Data

Jan. 29, 1998 [FR] France .................................. 98 00969

[51] Int. Cl.$^6$ ................................................. H01M 02/02
[52] U.S. Cl. ........................................... 429/120; 429/163
[58] Field of Search ..................... 429/120, 163, 429/167, 176

[56] References Cited

U.S. PATENT DOCUMENTS

| | | | |
|---|---|---|---|
| 3,745,048 | 7/1973 | Dinkler et al. ........................... | 136/166 |
| 5,443,926 | 8/1995 | Holland et al. ........................... | 429/120 |
| 5,569,552 | 10/1996 | Rao et al. .................................. | 429/72 |
| 5,641,589 | 6/1997 | Grivel et al. ............................. | 429/120 |

FOREIGN PATENT DOCUMENTS

| | | |
|---|---|---|
| 0 596 778 A1 | 5/1994 | European Pat. Off. . |
| 2 742 002 A1 | 6/1997 | European Pat. Off. . |
| 92 10 384 | 11/1992 | Germany . |

*Primary Examiner*—Maria Nuzzolillo
*Assistant Examiner*—Carol Chaney
*Attorney, Agent, or Firm*—Sughrue, Mion, Zinn, Macpeak & Seas, PLLC

[57] ABSTRACT

The present invention relates to a sealed battery block operating at a pressure of at least 1 bar relative, the battery including a container made of a plastics material and made up of a lid and of a case subdivided into wells by at least one partition, said battery being provided with a cooling system including two cheek plates made of a plastics material and co-operating with the outside faces of respective ones of two opposite walls of said case, each cheek plate co-operating with the corresponding wall to define a compartment provided with a plurality of ribs forming baffles for fluid flow purposes, and with an inlet orifice and an outlet orifice for the fluid, said battery being characterized in that each of said ribs extends in a direction that forms an angle relative to the plane of said partition lying in the range 60° to 90°.

8 Claims, 5 Drawing Sheets

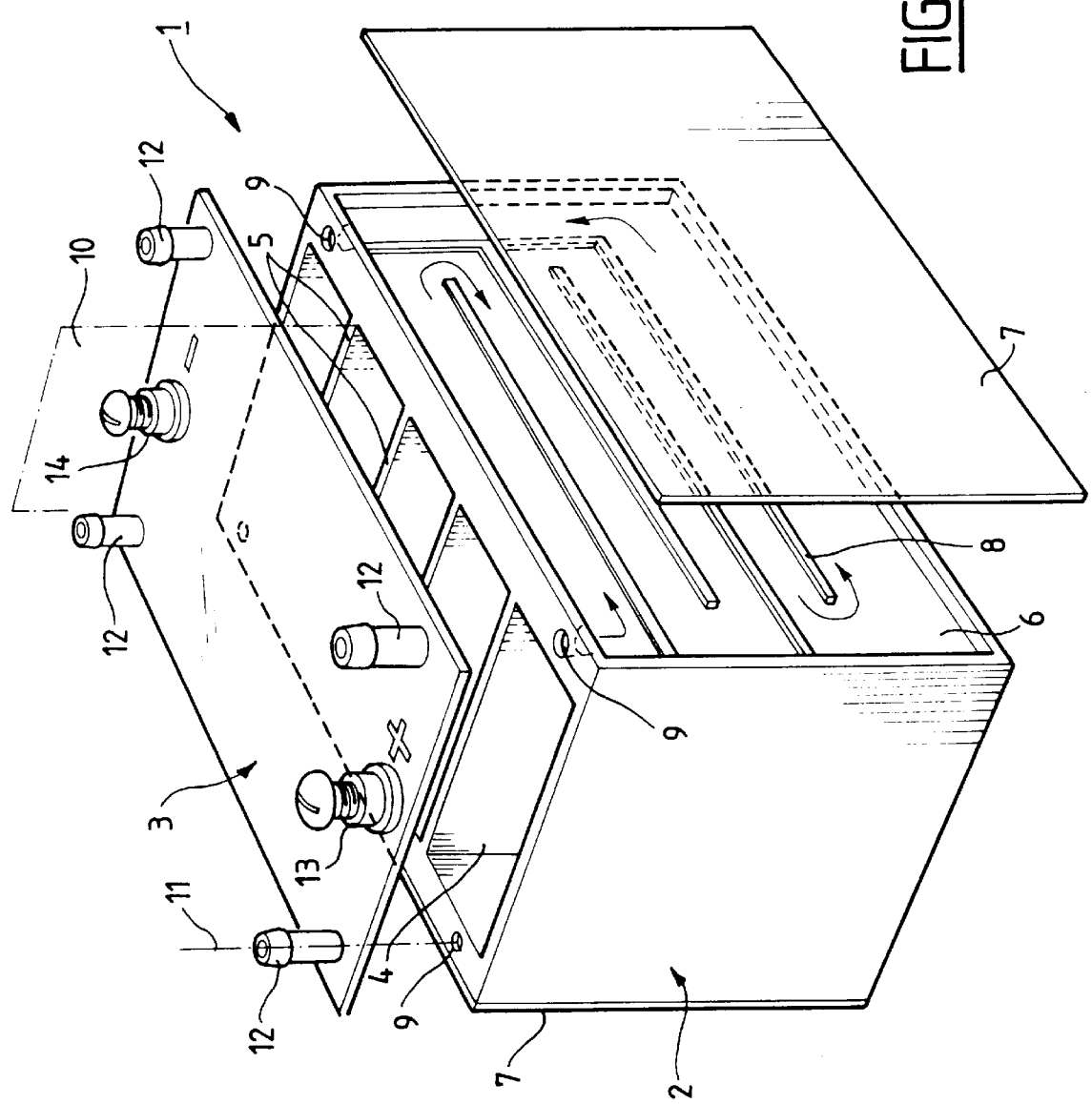
FIG_1

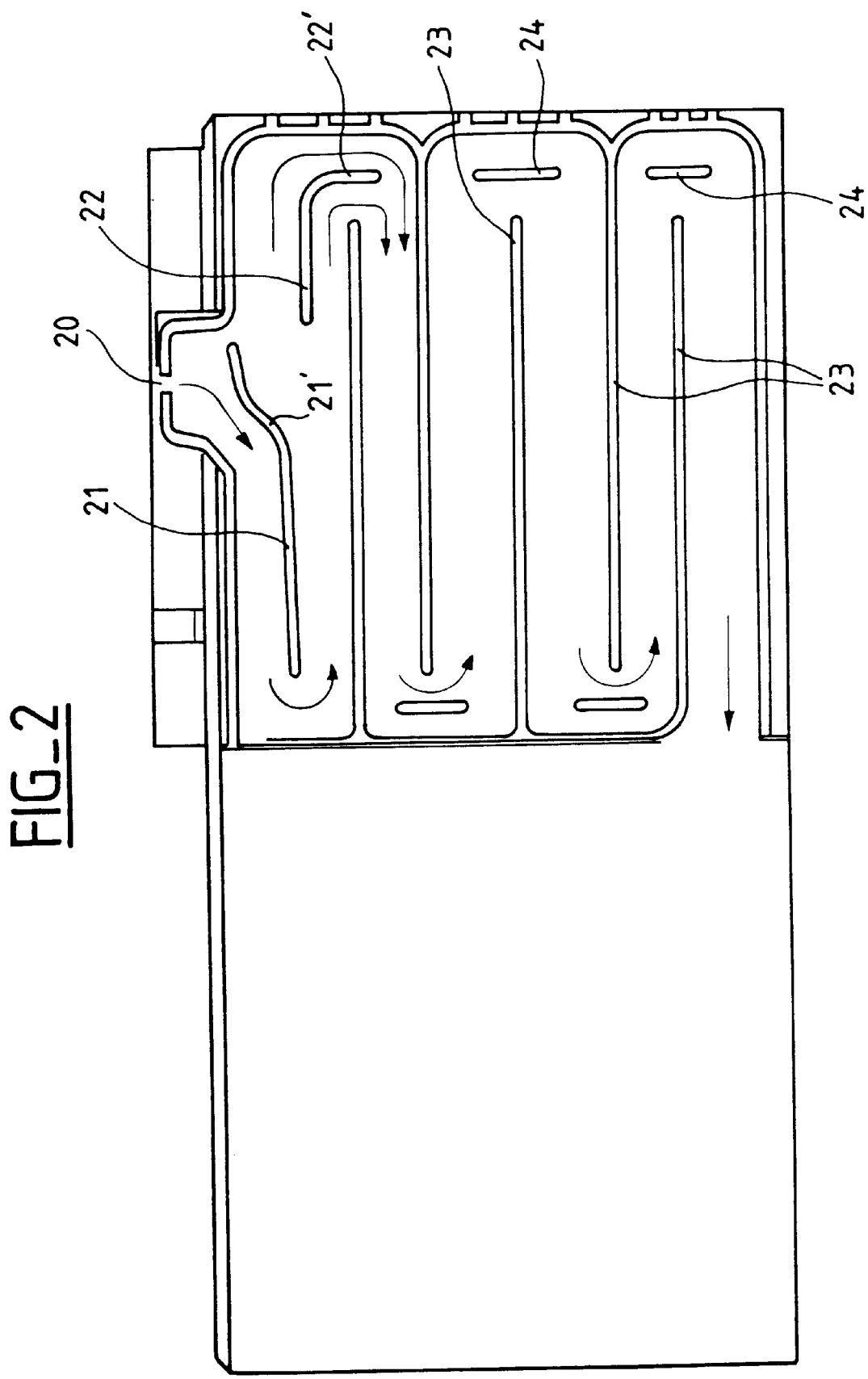
FIG_2

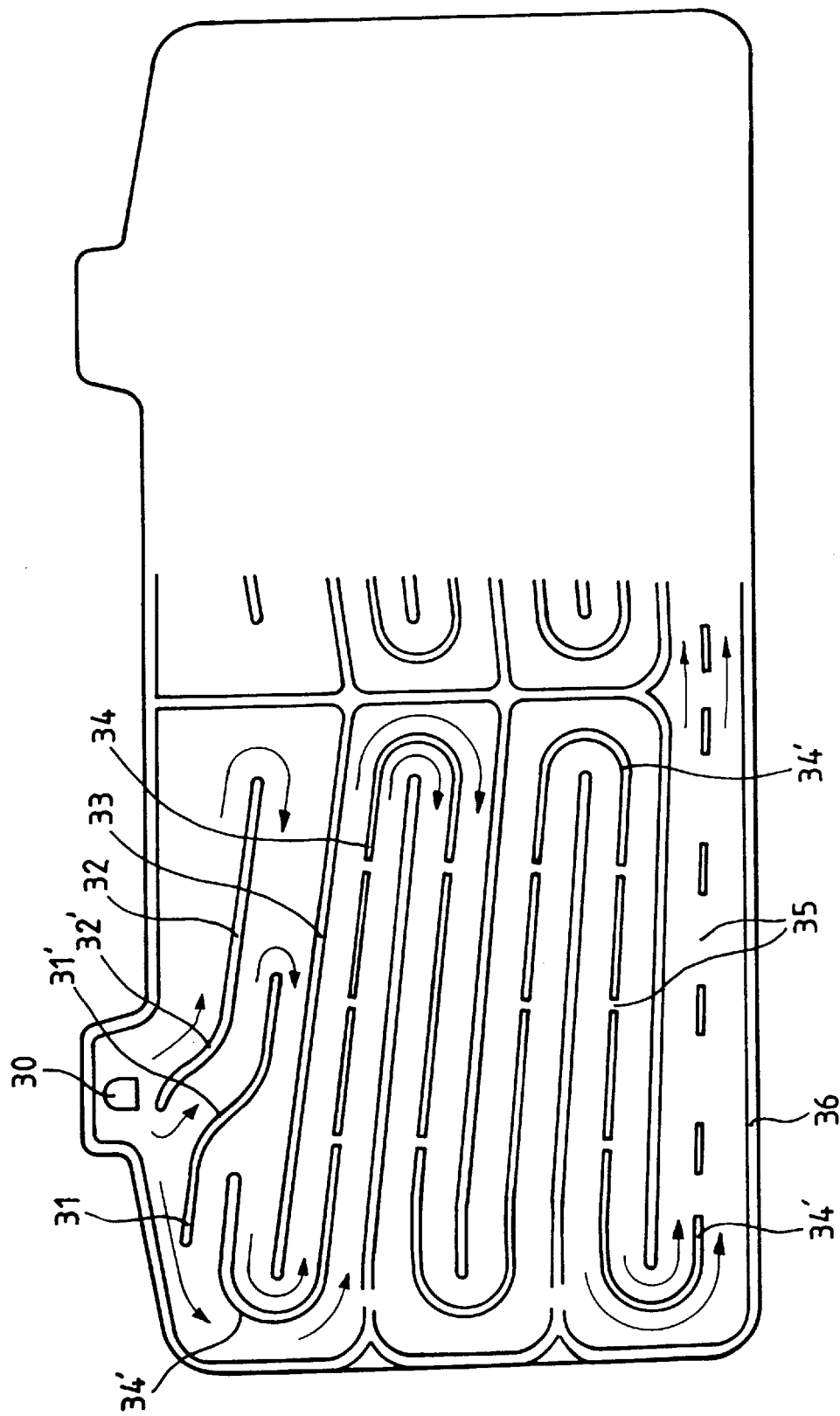
FIG_3

FIG_4
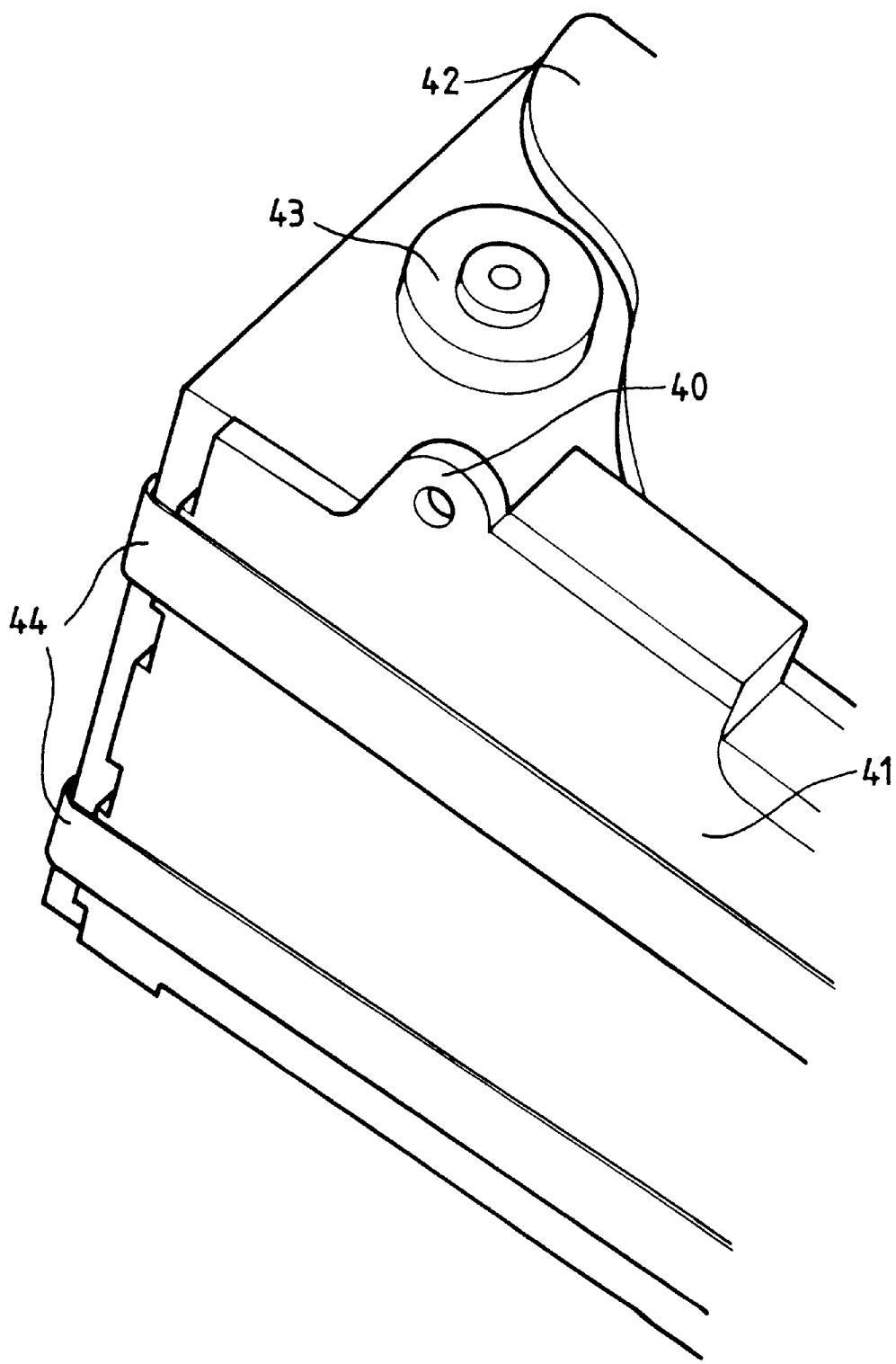

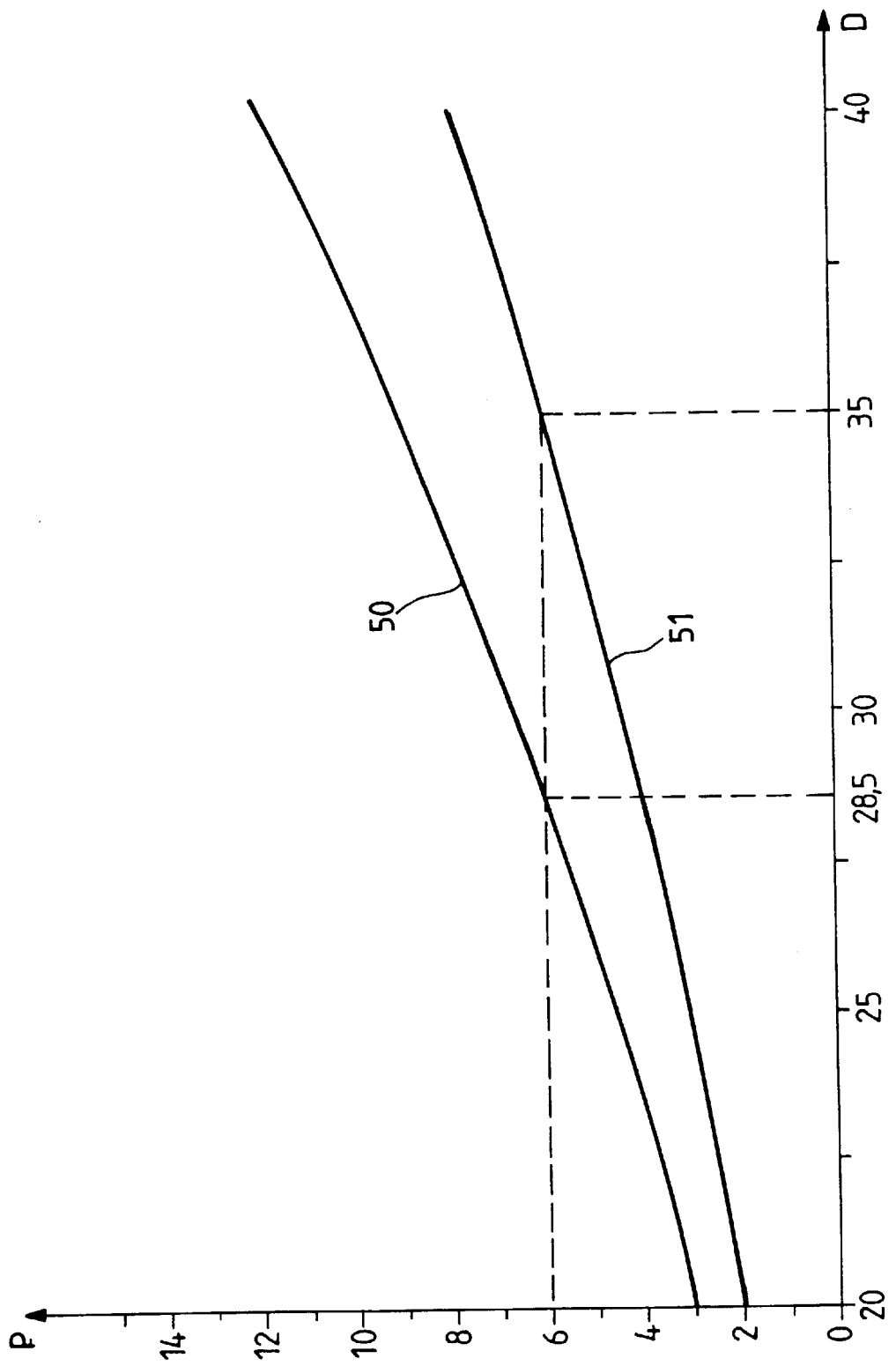

SEALED BATTERY BLOCK PROVIDED WITH A COOLING SYSTEM

The present invention relates to a sealed battery block of storage cells provided with a circulating-fluid cooling system.

A block-type battery of storage cells has a single container that is, in general, made of plastic and is prismatic in shape, the container being made up of a case and of a lid. The case is subdivided into wells separated by partitions and receiving storage cell units. Each cell unit is an electrochemical assembly of positive and negative electrodes disposed in alternation and separated from one another by separators, the assembly being immersed in an electrolyte. Such batteries have capacities lying in the range 5 Ah to 250 Ah, and energy densities of not less than 55 Wh/kg. They are used, in particular, for powering electric vehicles.

It is known that the various operating states of a battery of storage cells (charging, overcharging, discharging) lead to increases in temperature that modify its performance. A battery block provided with a circulating-fluid cooling system is described in European Patent Application EP-0 596 778. The cooling system includes two cheek plates bonded in sealed manner to respective ones of two opposite walls of the case made of plastic. Each of the plates co-operates with the corresponding wall to define a flow compartment, at the top of which an inlet orifice and an outlet orifice are provided for the fluid, the orifices being situated in the lid of the battery. A plurality of vertical ribs form baffles in said compartment for fluid flow purposes. To enable the heat to be removed effectively, the walls of the case carrying the plates are thin (2 mm).

The maximum operating pressure of the battery block is set by the relief pressure of a valve. When the maximum relative pressure is not more that 1 bar (pressure difference relative to atmospheric pressure), the valve opens periodically. The gases are released, thereby consuming water from the electrolyte. The battery therefore requires regular maintenance, i.e. more water must be added frequently. Such a battery may be said to be "open". To avoid having to top up the electrolyte after periods of operation, batteries have been developed that may be said to be "sealed" and that operate at a pressure greater than 1 bar relative.

The cooling system described in French Patent No. 2 697 678 cannot be used in a sealed battery block because the thinness of the walls makes the container incapable of withstanding internal pressure exceeding 1 bar relative. A first solution is to increase the thickness of the side walls so as to increase the strength thereof, but cooling then does not take place with the required effectiveness, thereby degrading performance, and shortening life span. In another solution, using the same wall thickness, it is possible to reduce the width of each of the wells so as to bring the separating partitions closer together. The electrochemical assemblies which are then placed in the wells have fewer electrodes, and the battery therefore has a lower capacity.

Furthermore, other known cooling systems make the battery less compact.

An object of the invention is to provide a sealed battery block provided with a cooling system that is effective and compact, the thickness of the wall of the case being not more than 2.5 mm so as to make cooling effective.

The present invention provides a sealed battery block including a container made of a plastics material and made up of a lid and of a case subdivided into wells by at least one partition, said battery being provided with a cooling system including two cheek plates made of a plastics material and co-operating with the outside faces of respective ones of two opposite walls of said case, each cheek plate co-operating with the corresponding wall to define a compartment provided with a plurality of ribs forming baffles for fluid flow purposes, and with an inlet orifice and an outlet orifice for the fluid, said battery being characterized in that each of said ribs extends in a direction that forms an angle relative to the plane of said partition lying in the range 60° to 90°.

Not all of the ribs form the same angle with the planes of the partitions. In a variant, said angle varies with the distance between said ribs and said inlet orifice or said outlet orifice for said fluid. For example, the angle may be larger close to the fluid inlet, and it may decrease going away from the inlet orifice, and then increase again to its initial value in the vicinity of the outlet orifice.

The orifices situated at the top of the compartment communicate with tubular spiggots serving to interconnect the blocks. When the axis of each orifice is vertical, the direction of each of said ribs also forms an angle relative to the axis of each of said orifices lying in the range 60° to 90°. The inclination of each of the ribs or of a portion of each of the ribs that are placed in the vicinity of the fluid inlet and outlet orifices is determined by fluid distribution and collection. When a liquid flows, passageways are provided across the ribs to remove the gas bubbles.

This configuration reinforces the strength of the wall situated between the ribs and the partitions.

In a first embodiment, said ribs are formed on said wall, and they are not fixed subsequently.

In a second embodiment, said ribs are formed symmetrically both on said wall and on said cheek plate, and then the corresponding shapes are fixed together at the same time as said cheek plate is fixed to said wall.

Fixing said cheek plate to said wall, or fixing together the two portions of each of said ribs is preferably performed by welding, in particular by heat-mirror welding with or without contact, also referred to as heat-sealing, or by vibration welding if the materials lend themselves to such welding. In some cases, assembly may also be obtained by gluing.

In an improvement, said cheek plate carries a handling tab. Preferably, the tab does not extend beyond the envelope of the battery block's volume. For example, the tab may be constituted by a plane handle parallel to the plane of the cheek plate and provided with means making it easier to grasp, such as an eye or a piece of relief.

Preferably, said battery is provided with holding means for holding plates disposed at either end of the battery, which end plates carry recesses for guiding said means. The means may be constituted by ties which are welded, riveted, or screwed to the end plates, or else by a belt surrounding the battery. The geometrical shape of the section of the recess depends on the shape of the chosen holding means. The presence of the holding means contributes to increasing the mechanical robustness of the container. In a variant, said cheek plates also carry recesses for guiding said means.

The invention will be better understood, and other advantages and features will appear on reading the following description given by way of non-limiting example and with reference to the accompanying drawings, in which:

FIG. 1 is a diagrammatic perspective view showing the configuration of the baffle-forming ribs inside a fluid-flow compartment that is part of a battery block of the invention;

FIG. 2 shows a variant of a cooling fluid flow circuit that is part of a battery block of the invention;

FIG. 3 shows another variant of a cooling fluid flow circuit that is part of a battery block of the invention;

FIG. 4 is a fragmentary perspective view of an embodiment of a battery block of the invention; and FIG. 5 shows the stress P (in MPa) that is generated by the pressure of the gas on the inside surface of the case wall that forms the flow compartment, as a function of the distance D (in mm) between two consecutive partitions.

A sealed battery block 1 of the invention is shown in FIG. 1. In particular, it may be a battery of lead, nickel-cadmium, nickel-metal hydride, nickel-zinc, or lithium-carbon storage cells. Its casing is made of a plastics material and it is constituted by a case 2 and by a lid 3 welded on by being heat-sealed to the case 2. The case 2 is subdivided into wells 4 by vertical partitions 5 disposed perpendicularly to the longitudinal walls 6.

Two cheek plates 7 made of a plastics material are heat-sealed in fluid-tight manner to the longitudinal walls 6, thereby co-operating with the corresponding walls to define compartments in which the fluid can flow. For example, the fluid may be a mixture of water with a glycol (such as ethylene glycol) at a concentration in the range 20% by weight to 50% by weight. To make cooling effective, the flow rate in each compartment is approximately in the range 20 liters per hour to 80 liters per hour.

Each of the longitudinal walls 6 of the battery is provided with five horizontal ribs 8 which define baffles for fluid flow purposes, as indicated by the arrows. Inlet and outlet orifices 9 are provided for the fluid at the tops of the compartments. The ribs extend in a direction that forms an angle of 90° relative to the plane 10 of each of the partitions, and relative to the axis 11 of each of the orifices 9. The orifices 9 communicate with tubular spiggots 12 placed on the lid. The lid also carries the positive terminal 13 and the negative terminal 14.

FIGS. 2 and 3 show respective embodiments of cooling circuits of the present invention. Since each circuit is made up of two identical portions placed symmetrically, only one portion of each circuit is shown. These configurations make it possible to obtain uniform stress distribution.

In the FIG. 2 embodiment, a fluid inlet orifice 20 is provided at the top of the compartment. The ribs 21, 22, 23 are disposed horizontally, except for the portion 21' of the rib 21 placed in the vicinity of the fluid inlet, this portion being inclined at 45° so as to receive and distribute the incoming fluid. Means 22', 24 for guiding and splitting the flow are disposed perpendicularly to the ends of the ribs 22, 23. The fluid enters the circuit via the orifice 20 whose axis is vertical and is parallel to the planes of the partitions of the wells, and the fluid is then distributed in the circuit as indicated by the arrows. At the bottom of the compartment, the fluid continues its journey through the symmetrical portion (not shown) and is then removed via an orifice disposed analogously to the orifice 20.

FIG. 3 shows a fluid inlet orifice 30 of horizontal axis and provided at the top of the compartment. Each of the ribs 31, 32, 33, 34 is disposed at an angle greater than 60° relative to the planes of the partitions, except for the portions 31' and 32' of the ribs 31 and 32, which portions are placed in the vicinity of the fluid inlet, and are inclined at 45° so as to receive and distribute the incoming fluid. The angle made by the direction of each of the ribs 31, 32, 33, 34 with the planes of the partitions is in the vicinity of 60° for the ribs placed close to the inlet orifice 30. This angle increases going towards the base of the wall to a value in the vicinity of 90° (rib almost horizontal) at the base of the left portion of the circuit, thereby enabling the left portion to communicate with the right portion (not shown) of the circuit.

The ribs 34 are further interconnected by curved portions 34' for guiding and splitting the flow, and for stiffening the cooling circuit. The ribs 32 and 33 are formed by injection molding both on the wall of the case and on the cheek plate. When the wall and the cheek plate are disposed facing each other to be heat-sealed, the two corresponding portions of the rib press against each other. The ribs 31 and 34 are formed on the wall of the case only, and they are not heat-sealed; they may optionally be omitted.

Passageways 35 are provided across the ribs 34 for the purposes of removing gas bubbles. The fluid enters the circuit via the orifice 30, and the fluid is then distributed in the circuit as indicated by the arrows. At the bottom of the compartment, the fluid continues on its journey through the symmetrical portion (not shown), and is then removed via an outlet orifice disposed analogously to the orifice 30.

As shown in FIG. 4, handling tabs 40 may be provides on the outside face of the cheek plate 41 such that their tops do not extend above the plane of the top face of the cover 42 protecting the electrical terminals 43. It is also possible for the outside face of the cheek plate 41 to be provided with recesses for receiving holding means, such as, for example, at least one metal belt 44 surrounding the battery.

EXAMPLE 1

A prior art battery block was made, analogous to the battery described in European Patent Application EP-0 596 778, provided with a cooling system whose ribs made angles of less than 60° with the planes of the partitions separating the wells. The walls of the case that formed the cooing system were made of polyolefin and were 2 mm thick. The cheek plates were 2.5 mm thick, and each of them defined a flow compartment that was 3 mm thick, i.e. the total thickness of each circuit of the cooling system was 7.5 mm. The distance between two successive partitions was 34 mm. Each of the cell units making up the battery thus had 15 electrochemical couples, i.e. the battery had a capacity of about 100 Ah.

The internal operating pressure of the battery was forced to 2.8 bars relative. The maximum measurable stress generated on the walls was 10.4 MPa, which resulted in deformation of 2.78 mm. Such stress gives rise to risks such as the risk of the case bursting by the material creeping, or the risk of poor thermal contact between the cell assemblies and the wall of the case.

EXAMPLE 2

A battery of the invention was made that was analogous to the battery in Example 1, except that it was provided with a cooling system whose ribs made angles greater than 60° with the planes of the partitions separating the wells. Each of the walls of the case that formed the cooling system was 2 mm thick, and the total thickness of each circuit of the cooling system was 7.5 mm. The distance between two successive partitions was 34 mm. Thus, each of the cell units making up the battery had 15 electrochemical couples, i.e. the battery had a capacity of about 100 Ah.

The internal operating pressure of the battery was forced to 2.8 bars relative. The maximum measurable stress generated on the walls was 4.9 MPa. The cooling system of the present invention made possible to reduce by 53% the stress generated by an internal pressure of 2.8 bars on a wall made of the same material.

EXAMPLE 3

For reasons of reliability and safety, users of these batteries cannot accept stresses greater than 6 MPa. To this end a battery was made that was analogous to the battery in Example 2, except that the total thickness of each circuit of the cooling system was 7 mm.

The internal operating pressure of the battery was forced to 2.8 bars relative. The maximum measurable stress generated on the walls was 5.6 MPa, which resulted in deformation of 2.12 mm. Compared with the prior art, the stress was reduced by 46%, and the resulting deformation was reduced by 24%.

By means of the invention, it was possible to reduce the total volume of the battery, while staying within the acceptable risk threshold set by the user.

The characteristics and the results of the above examples are given in the following table:

TABLE

|  | Example 1 | Example 2 | Example 3 |
|---|---|---|---|
| Width D of wells: | 34 mm | 34 mm | 34 mm |
| Thickness of the compartment-forming wall: | 2 mm | 2 mm | 2 mm |
| Total thickness of the cooling circuit: | 7.5 mm | 7.5 mm | 7.5 mm |
| Internal pressure: | 2.8 bars | 2.8 bars | 2.8 bars |
| Stress P generated on the wall: | 10.4 MPa | 4.9 MPa | 5.6 MPa |

For a maximum stress of 6 MPa, curve 50 in FIG. 5 shows that the width of each of the wells cannot exceed 28.5 mm for a prior art cooling system whose ribs make angles of less than 60° with the planes of the partitions, i.e. with 12-couple cell units. Under the same conditions, the width of the ribs can reach 35 mm (15 couples) for a battery of the present invention (curve 51).

Naturally, the various numerical applications given are given merely by way of non-limiting example.

We claim:

1. A sealed battery block operating at a pressure of at least 1 bar relative, the battery block including a container made of a plastics material and made up of a lid and of a case subdivided into wells by at least one partition, said battery being provided with a cooling system including two cheek plates made of a plastics material and co-operating with the outside faces of respective ones of two opposite walls of said case, each cheek plate co-operating with the corresponding wall to define a compartment provided with a plurality of ribs forming baffles for fluid flow purposes, and with an inlet orifice and an outlet orifice for said fluid, said battery being characterized in that each of said ribs extends in a direction that forms an angle relative to the plane of said partition lying in the range 60° to 90°.

2. A battery according to claim 1, in which said angle varies with the distance between said ribs and said inlet orifice or said outlet orifice for said fluid.

3. A battery according to claim 1, in which said ribs are formed on said wall.

4. A battery according to claim 1, in which said ribs are formed symmetrically both on said wall and on said cheek plate, and then the corresponding shapes are fixed together at the same time as said cheek plate is fixed to said wall.

5. A battery according claim 1, in which the fixing is performed by welding chosen from heat-mirror welding and ultrasound welding.

6. A battery according to claim 1, in which said cheek plate carries a handling tab.

7. A battery according to claim 1, in which said battery is provided with holding means for holding plates disposed at either end of the battery, which end plates carry recesses for guiding said means.

8. A battery according to claim 7, in which said cheek plates carry recesses for guiding said means.

* * * * *